E. R. WETHERED.
Pulley-Block.
No. 198,527.  Patented Dec. 25, 1877.
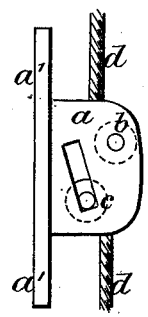 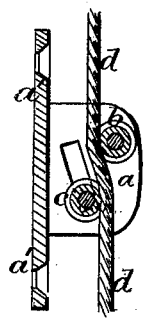 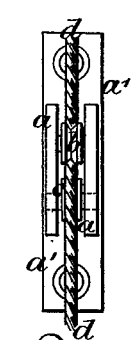 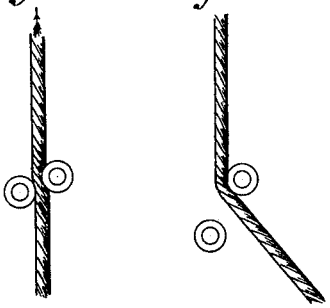 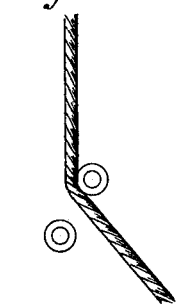
Fig. 1.  Fig. 2.  Fig. 3.  Fig. 4.  Fig. 5.
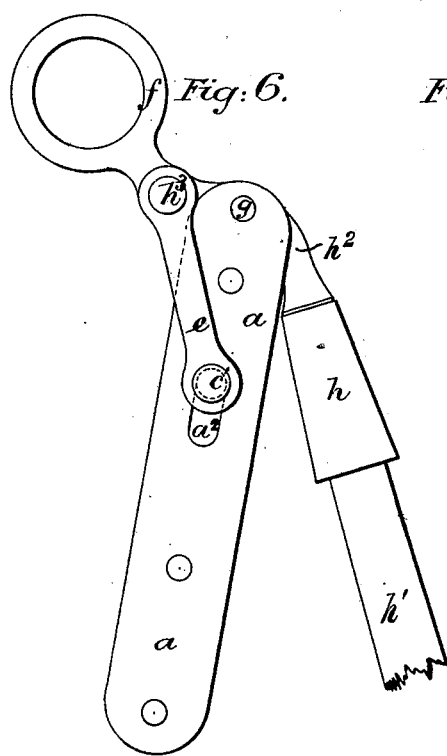 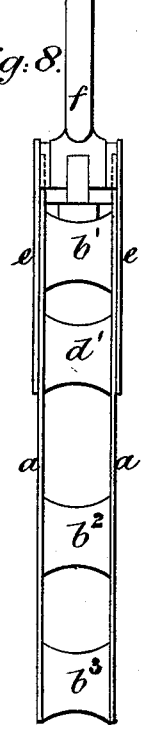 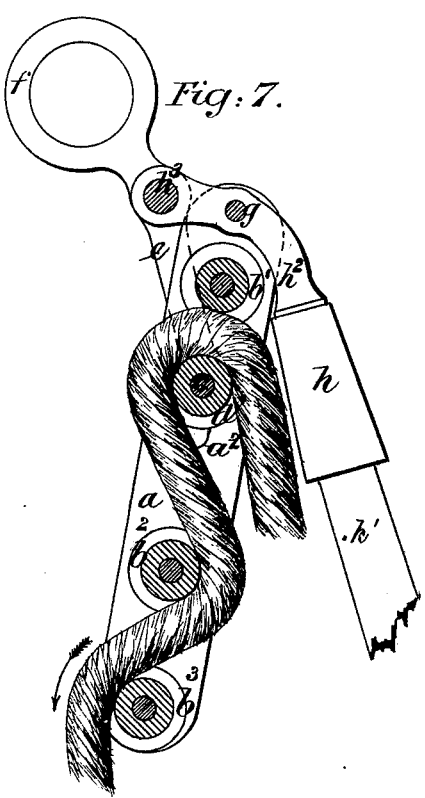
Fig. 6.  Fig. 8.  Fig. 7.
WITNESSES:
Wm A Skinkle
G. W. Breck
INVENTOR:
Edwin R Wethered
By his Attorneys,
Baldwin, Hopkins, & Peyton.

UNITED STATES PATENT OFFICE.

EDWIN ROBERT WETHERED, OF WOOLWICH, ENGLAND.

IMPROVEMENT IN PULLEY-BLOCKS.

Specification forming part of Letters Patent No. 198,527, dated December 25, 1877; application filed September 18, 1877; patented in England, December 24, 1874, for fourteen years.

*To all whom it may concern:*

Be it known that I, EDWIN ROBERT WETHERED, of Woolwich, in the county of Kent, England, Major R. A., have invented new and useful Improvements in Pulley-Blocks, which improvements are fully set forth in the following specification, reference being had to the accompanying drawings.

The object of this invention is so to construct pulley-blocks with two or more sheaves that the rope or line passed through the block may be able to run freely between the sheaves in one direction, but in the other direction will have a considerable resistance offered to it.

For this purpose I mount one of the sheaves of the block in such a manner that its axis is able to move laterally in the frame of the block, and that when the rope or line tends to run in one direction, it draws the movable sheave and another sheave together, and causes the rope or line to be more or less nipped; whereas, when the tendency is to run in the opposite direction, this nip does not take place.

In order that my said invention may be most fully understood and readily carried into effect, I will proceed to describe the drawings hereunto annexed.

Figure 1 is an elevation, Fig. 2 is a section, and Fig. 3 is an edge view, of a block provided with a movable sheave arranged in accordance with my invention.

$a\ a$ are the cheeks of the block. They are formed in connection with a foundation-plate, $a'$, which is fixed by screws in any position where the block may be required. The cheeks $a$ carry the axis of the main or fixed sheave $b$, and they are slotted to hold and guide the axis of the movable sheave $c$. $d$ is the rope or cord wove through the block.

Fig. 4 is a diagram representing the position of the sheaves when the rope or cord is nipped and held. The strain is supposed to be in the direction of the arrow. Fig. 5 is a diagram representing the position of the sheaves when the rope or cord is free to run.

When the rope or cord is held clear of the movable sheave, as represented in this diagram, it is free to run in either direction.

Blocks made of small size, as represented in the drawings, are very suitable for use in connection with the cords of window-blinds.

Fig. 6 is an elevation, Fig. 7 is a section, and Fig. 8 is an edge view, of another form of my invention, showing a modification of block, applicable where heavy weights are to be lowered, provided with a movable sheave arranged in accordance with my invention, so as to nip the rope or line when tending to run in the direction indicated by the arrows, but to allow it to pass freely in the contrary direction.

$a\ a$ are the cheek-plates of the block. They are held together by studs, on which the fixed sheaves $b^1\ b^2\ b^3$ are able to turn freely. The cheek-plates are also slotted at $a^2$ for the passage of the axis $c'$, on which the sheave $d'$ is mounted, so that this sheave is movable laterally in the frame of the block. $e\ e$ are side links passing from the axis $c'$ to the ring $f$, by which the block is suspended. $g$ is a stud at the upper ends of the block, and on it is mounted the socket $h$, which receives the stick $h^1$. This stick is provided in order that the block may readily be suspended from a hook overhead when required for use, and also to enable an attendant to regulate the amount of pressure or nip upon the rope. The socket $h$ has a stem, $h^2$, which is also jointed at $h^3$ to the ring $f$, and the parts are thus held in proper relative positions, at the same time allowing the requisite freedom of motion.

By this modification of the invention it will be seen that the rope is nipped between the sheaves $b^1$ and $d'$ in substantially the same manner as the cord is clamped between the sheaves $b$ and $c$ of Figs. 1 to 5—that is, by the lateral movement or approach of one of the sheaves toward the other.

In operation, the load to be lowered—from the upper floor of a warehouse to the ground, for instance—is attached to the end of the rope which hangs downward from the sheaves $b^3$, after being passed between the different sheaves, as shown in Fig. 7. The weight will obviously produce a tendency of the block-frame or cheek-plates to assume a position as near as may be beneath the ring $f$ or point of suspension.

It will be seen that the socket-stem $h^2$ and the cheeks or block-frame form, by reason of the joints $g$ and $h^3$, a double-jointed or toggle lever, the tendency of which is to straighten out when the strain of the load is upon the block-frame. As the links $e\,e$, which connect the sheave $d'$ with the ring, keep this sheave always at the same distance from the ring, it is obvious that the rope will be clamped between the sheaves $b^1$ and $d'$.

By swinging the socket $h$ outward from the frame upon the joint $g$, the clamp upon the rope may be relieved, while by swinging it inward the nip of the rope is increased.

Having thus described the nature of my said invention, and the manner of performing the same, I would have it understood that I claim—

The combination, substantially as hereinbefore set forth, in a pulley-block, of cheek-plates, a fixed sheave, and a laterally-moving sheave working in slots in the cheek-plates, whereby the cord or rope is nipped between the sheaves as it passes in one direction, and is left free to move in the opposite direction, as specified.

London, 11th August, 1877.

E. R. WETHERED.

Witnesses:
　WILMER M. HARRIS,
　JOHN DEAN,
*Both of No. 17 Gracechurch Street, London, E. C.*